Nov. 24, 1964    A. H. VAN DER MEER    3,158,218
PRECISION BALANCE
Filed Aug. 1, 1963
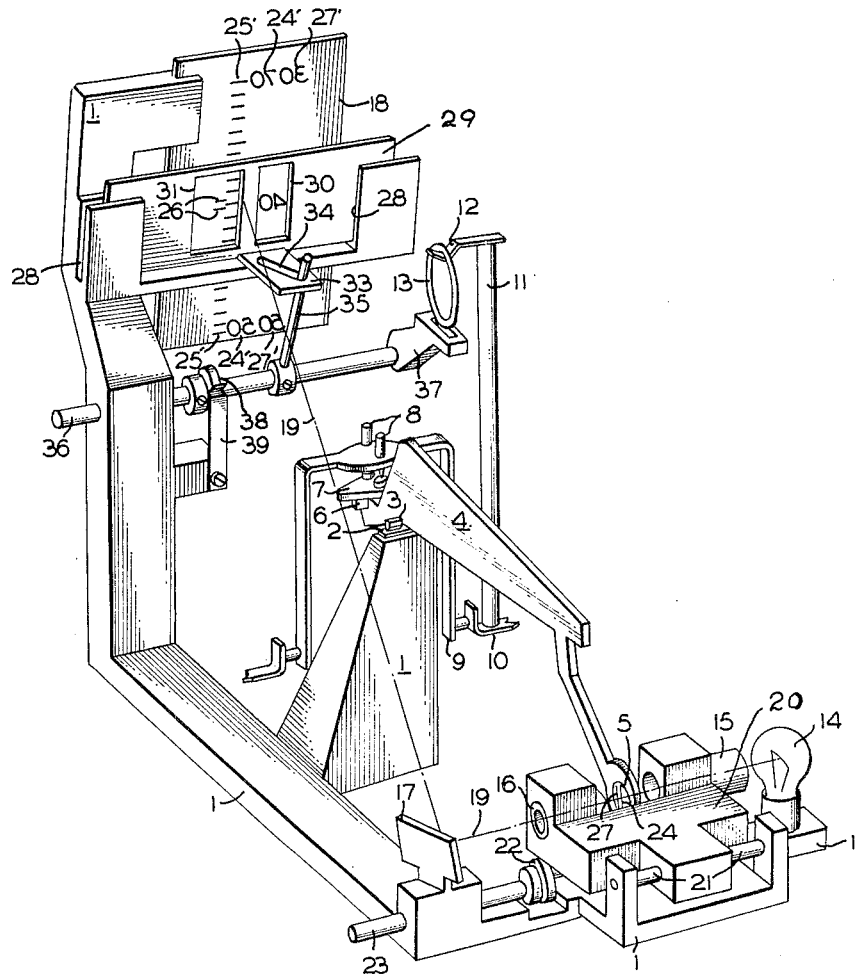
INVENTOR
ALBERT HENDRIK VAN DER MEER
BY *Lawrence E. Laubscher*
ATTORNEY

United States Patent Office 3,158,218
Patented Nov. 24, 1964

3,158,218
PRECISION BALANCE
Albert Hendrik van der Meer, Glarnischstrasse 210,
Männedorf, Zurich, Switzerland
Filed Aug. 1, 1963, Ser. No. 299,316
Claims priority, application Switzerland, Feb. 18, 1963,
2,011/63
2 Claims. (Cl. 177—178)

This invention relates to a precision balance and more particularly to a precision balance comprising a weighing beam and a taring device.

An object of the invention is to provide in a balance of the type stated a measuring plate on the weighing beam which has two rows of numbers, the sequence of the numbers in one row being complementary to the numbers of the sequence of the other row, an optical reading device for reproducing an image of those numbers which are in its optical path, and a change-over device having adjusting means in said optical path to permit the numbers in only one of said rows to be made visible at will. Another object of the invention is a balance of the kind outlined wherein both rows of said numbers are arranged sufficiently closely together on said measuring plate to enable both to be reproduced together by said optical reading device, said adjusting means comprising a shutter located at a position where both rows of numbers are reproduced together and arranged to obscure the image of one of said rows of numbers so that only the other row of numbers becomes visible. A still further object of the invention is a precision balance of the kind stated and comprising an objective of said optical reading device which is mounted for micrometric displacement so as to form part of a precision taring device, and said change-over device being coupled to a lifting member for depositing a control weight on a pan carrier when one of said rows of numbers is made visible and lifting it off as soon as the other row of numbers is visible, the mass of said control weight being equal to the weight range covered by each complete row of numbers according to the maximum inclinations of said balance beam.

The invention and the above noted and other features thereof will be understood more clearly and fully from the following detailed description with reference to the accompanying drawing, which is a perspective view into an analytical balance from the rear and showing a specific embodiment of the balance according to the invention.

Fixed to the frame 1 of the balance is a smooth-ground plate 2 acting as a support for the central knife edge 3 of the weighing beam 4. The beam 4 has a measuring plate 5 on its longer arm. The shorter arm of the beam 4 has the usual outer knife edge 6, on which the pan-carrier rests. The pan-carrier comprises a bearing plate 7 mounted on the outer knife edge 6, an intermediate yoke 9 supported thereon by pins 8, a supporting yoke 10 articulated to the intermediate yoke 9, and a bar 11 extending upwardly from the yoke 10, on which bar a hook 12 is mounted to receive an additional control weight 13. Only a fragment of the supporting yoke 10 is reproduced; the lower part thereof, which is not shown, is provided as usual with supports to receive the normal control weights and possibly the control weights associated with an approximate taring device, and its lower end also carries the scale pan via an articulated connection. For reasons of clarity, however, these members are not shown as they are not absolutely essential to an understanding of the invention.

An optical reading device is provided to enable the inclination of the beam 4 and thus the corresponding weight decimals to be read by means of the measuring plate 5. It comprises a lamp 14 mounted on the frame 1, an optical illuminating device 15, a magnifying device 16, a deflecting mirror 17 attached to the frame 1 and a matt or ground glass screen 18 mounted at the front of the frame 1. In the drawing, the screen 18 is seen from behind. The path 19 of the optical system is shown by the chain-dotted lines 19.

Unlike the above-mentioned approximate or rough adjustment taring device, the continuously adjustable precision taring device is shown in the drawing. It operates optically by suitable displacement of the illuminating device 15 and magnifying device 16 in planes parallel to that of the measuring plate 5 and in a direction at least approximately tangential to that in which the measuring plate 5 moves. For this purpose, the devices 15 and 16 are held in a U-shaped arm 20 which is mounted to pivot in the frame 1 by means of a horizontal shaft 21. The arm 20 rests on an eccentric disc 22 which can be turned by means of the shaft 23 mounted for rotation in the frame 1, so that rotation of the shaft results in a corresponding raising or lowering of the optical devices 15 and 16. The end of the shaft 23 projects from the housing of the balance in the usual way and is provided with a suitable operating knob (not shown).

The usual row 24 of numbers is inscribed on the measuring plate 5 along a short arcuate portion having its centre of curvature at the knife-edge of the central knife 3. The row 24 of numbers may have the sequence 0, 10, 20, etc., to 80, 90, 100. The number 0 is right at the top and the number 100 is right at the bottom of the arc. It is assumed in the drawing that the numbers 50, 60, 70 are in the optical path 19 and are reproduced on the screen 18 at 24'. If, for example, the measuring range obtainable only through inclination of the beam 4 is exactly 1 gram, then the numbers in the row 24 represent the appropriate number of hundredths of a gram. Since the row 24 is graduated in tens, a corresponding graduated scale divided into units may be provided in the usual way on the plate 5, possibly to the right of the row 24, i.e., outside the row 24 as viewed in a radial direction. The portion of such a graduated unit scale in the optical path 19 then appears on the screen 18 at 25', and the units to be read off will be found at the place where the catch mark 26 is mounted on the screen 18. It is, however, possible to omit this additional graduated scale and instead use unit graduations 0, 1, 2, etc., to 98, 99, 100, in the row 24.

Another row 27 of numbers is inscribed on the measuring plate 5 immediately adjacent the row 24, but the number sequence is complementary to that in the row 24. In the row 27 the number 100 is right at the top and the number sequence is continued downwardly in descending graduations of tens: 100, 90, 80, etc., to 20, 10, 0, when the plate 5 is viewed directly. The additional row 27 is close enough to the row 24 to enable both rows to be reproduced together to a magnified scale. That part of the row 27 which is in the path 19 accordingly appears on the screen 18 at 27'. If the first row 24 of numbers has the above-mentioned unit graduation 0, 1, 2, etc., to 98, 99, 100, then the other row 27 will be given the corresponding complementary unit graduation, 100, 90, 98, etc., to 2, 1, 0.

Mounted in the frame 1 of the balance is a guide 28 for a transversely movable shutter 29 located in the optical path 19 in the region between the screen 18 and the reflecting mirror 17. The shutter 29 has two windows 30 and 31 separated by a web 32. An oblique slot 34 is provided in a flange 33 of the shutter 29. In order that the shutter 29 can be moved transversely as required, a rod-like lever 35 projects into the slot 34 with sufficient clearance, the lever being fixed on a shaft 36 mounted for rotation in the frame 1. If the shaft 36 is turned counter-clockwise through a given angle out of the illustrated position, the slide 29 is obviously moved to the right until the lever 35 reaches the other end of the slot 34. At the same time, rotation of the shaft 36 has raised the lifting member 37 thereon sufficiently for the control weight 13 to be lifted off the hook 12 of the pan-carrier 7 to 12. In order to avoid unintentional movement of the shaft 36, a disc 38 with two notches is fixed thereon, the leaf spring 39 being adapted to snap into the notches.

The function of the change-over device 29 to 39 is to make the image of only of the rows of numbers visible at least at the reading location, i.e., in the vicinity of the catch or reading mark 26 on the screen 18, and to cover over the other row. In order that one row can be covered over not only in the region of the reading mark 26 but over the whole of the screen 18, the web 32 could be extended a suitable distance upwardly and downwardly. However, this is not shown in the drawing. When the change-over device 29 to 39 is at the end stop as shown, the normal row 24 of numbers has no image 24' formed on the screen at least so far as the portion in the path 19 is concerned, whilst the optically enlarged image 27' of the complementary row 27 is fully visible on the screen 18. The end position of the change-over device 29 to 39 as shown in the drawing is the one used for so-called subtraction weighing. For so-called additive weighing the other end position is used where, by rotating the shaft 36, the control weight 13 is lifted off the pan-carrier 12, the shutter 29 is moved to the right, the image 24' of the normal row 24 is visible on the screen 18 and the image 27' of the complementary row 27 is prevented from being formed by the web 32. If, as mentioned above, the measuring range covered purely by the maximum inclinations of the beam 4 is exactly 1 gram, then the control weight 13 must also weigh exactly 1 gram, so that the pan-carrier 7 to 12 is additionally loaded with 1 gram as soon as the change-over device 29 to 39 is brought into the end position shown, namely that intended for subtraction weighing.

By way of example, assume the problem is to remove from a vessel filled with a given substance a predetermined volume of the substance and of directly ascertaining the weight of the amount removed; for the sake of simplicity this weight is assumed to be less than 1 gram. The filled vessel is first placed on the scale-pan of the carrier 7 to 12 and the changeover device 29 to 39 is moved into the illustrated subtraction weighing position. The rough-adjustment taring device operating with a set of usual control weights (not shown) is adjusted accordingly, and the precision taring device is then actuated by rotating the shaft 23. The shaft 23 is turned in the appropriate direction and through an approprite angle until the zero graduation of the complementary row 27' is exactly centered in the catch mark 26. Now the desired volume of the substance can be removed from the vessel. Without having to operate any control weight or to adjust the precision taring device 20 to 23, one can observe which number in the complementary row 27' or which subdivision 25' thereof reaches the catch mark 26. This number is a direct reading of the mass of the substance removed.

In the reverse procedure, where a given volume of a substance has to be added to that in a partially filled vessel and the mass of the added substance ascertained directly, the shaft 36 is turned until the change-over device 29 to 39 takes up the other end position associated with additive weighing where the control weight 13 is lifted off the hook 12, the shutter 29 moved to the right so that its web 32 obscures the image 27' of the complementary row 27 of numbers and the normal row 24, i.e., its image 24' is visible on the screen 18. Again, the partly filled vessel is placed on the scalepan, then the approximate taring device (not shown) and next the precision taring device 20 to 23 are adjusted until the image of the number "0" in the normal row 24 of numbers appears in the region of the catch mark 26 and the zero graduation is exactly centered in the mark 26. Hereupon the substance is added to the vessel; it is assumed by way of example that the substance added weighs less than 1 gram. Without adjusting the precision taring device 20 to 23 it is now ascertained which graduation 25' arrives in the locality of the catch mark 26. The image 24' of the number in the normal row 24 associated with this graduation is then a direct reading of the weight of the amount of substance subsequently added.

By virtue of the change-over device 29 to 39 exactly the same procedure can be used for subtractive weighing as for additive weighing, and the result sought is indicated directly, so that in both cases extra calculations are dispensed with.

Since operation of the change-over device 29 to 39 causes simultaneously the control weight 13 to be suspended from the pan-carrier 7 to 12 for subtraction weighing and lifted off for additive weighing, the beam 4 is always given an inclination enabling the taring range to be covered by the precision taring device 20 to 23 to be small. These and other modifications and advantages which may occur to those familiar with the art fall within the spirit and scope of the invention as set forth in the following claims.

I claim:

1. A precision balance comprising a weighing beam, a measuring plate fixed to said beam, two rows of numbers inscribed on said measuring plate, the number sequence in one row being complementary to the number sequence in said other row, an optical reading device for reproducing an image of those numbers of said rows which are in its optical path, a continuously adjustable taring device, a change-over device having adjusting means in said optical path to permit the numbers in only one of said rows to be made visible at will, and a lifting member operatively connected to said change-over device for depositing a control weight on a pan-carrier suspended from said weighing beam when one of said rows of numbers is made visible and lifting said control weight off said pan-carrier as soon as said other row of numbers has been made visible.

2. The invention as recited in claim 1, wherein the mass of said control weight is at least approximately equal to the range of weight covered by each complete row of numbers according to the maximum inclination of said weighing beam.

References Cited by the Examiner

UNITED STATES PATENTS

| | | | |
|---|---|---|---|
| 1,494,565 | 5/24 | Abraham | 88—24 |
| 2,273,591 | 2/42 | Powell | 88—24 |
| 2,379,534 | 7/45 | Lowden | 88—24 |
| 3,026,768 | 3/62 | Appius | 88—24 |
| 3,053,143 | 9/62 | Meier | 177—178 |

ROBERT L. EVANS, *Primary Examiner.*

LEO SMILOW, *Examiner.*